United States Patent [19]

Fersht et al.

[11] 4,254,961
[45] Mar. 10, 1981

[54] SEAL FOR FLUID BEARINGS

[75] Inventors: Rena S. Fersht, Studio City; Winston L. Skinner, Canoga Park, both of Calif.

[73] Assignee: Litton Systems, Inc., Beverly Hills, Calif.

[21] Appl. No.: 34,549

[22] Filed: Apr. 30, 1979

[51] Int. Cl.³ .................... F16J 15/00; F16J 15/40
[52] U.S. Cl. .............................. 277/80; 308/9; 308/10; 308/36.3; 308/187.1
[58] Field of Search ............ 277/80; 308/9, 10, 36.1, 308/36.3, 187.1, 187.2

[56] References Cited

U.S. PATENT DOCUMENTS

| | | | |
|---|---|---|---|
| 2,557,140 | 6/1951 | Razdowitz | 277/80 |
| 2,996,162 | 8/1961 | Lehde | 277/80 X |
| 3,475,975 | 11/1969 | Sokol et al. | 308/10 X |
| 3,483,969 | 12/1969 | Rosenzweig | 209/1 |
| 3,612,630 | 10/1971 | Rosenzweig | 308/10 |
| 3,620,584 | 11/1971 | Rosenzweig | 308/187.1 |
| 3,726,574 | 4/1973 | Tuffias et al. | 308/36.3 |
| 3,746,407 | 7/1973 | Stiles et al. | 308/36.3 |
| 3,780,593 | 12/1973 | Coleman et al. | 74/5 R |
| 3,891,282 | 6/1975 | Tuffias | 308/9 |
| 3,918,773 | 11/1975 | Tuffias | 308/10 |

FOREIGN PATENT DOCUMENTS

| | | | |
|---|---|---|---|
| 680233 | 10/1952 | United Kingdom | 277/80 |
| 783881 | 10/1957 | United Kingdom . | |
| 494553 | 2/1976 | U.S.S.R. | 277/80 |
| 550499 | 4/1977 | U.S.S.R. | 308/9 |

*Primary Examiner*—Robert S. Ward, Jr.
*Attorney, Agent, or Firm*—Roy L. Brown; H. E. Gillmann

[57] ABSTRACT

Apparatus for containing a ferro-fluid within a reservoir of ferro-fluid using a pair of ferro-magnetic members adjacent each other and having opposing surfaces shaped as segments of surfaces of revolution, including magnetic apparatus for producing magnetic flux across the gap between the opposing surfaces. The surfaces diverge, and the greater magnetic flux density at the closely spaced edges of the pocket formed by the surfaces hold the ferro-magnetic particles of the ferro-fluid in that region. The volume between the two opposing surfaces is adequate to accommodate the thermal and pressure expansion and contraction of the fluid. The spacing between opposing members at the edge of farthest advance of the fluid is sufficiently small to allow the surface tension of the fluid to hold the fluid.

18 Claims, 4 Drawing Figures

U.S. Patent  Mar. 10, 1981  Sheet 1 of 2  4,254,961

SEAL FOR FLUID BEARINGS

BACKGROUND OF THE INVENTION (1) Field of the Invention

This invention pertains to apparatus for limiting leakage from ferro-hydrodynamic bearings of the type described, for example, in United States class 308/10.

(2) Description of the Prior Art

United Kingdom Pat. No. 783,881 teaches the use of liquids containing ferromagnetic particles as gas seals. The liquids are concentrated in a desired region adjacent a rotatable shaft by electromagnets having contoured poles.

U.S. Pat. No. 3,483,969 pertains to a method for separating materials of different density wherein a controlled magnetic field is passed through a ferro-fluid. A magnetic sieve approach is used wherein the field intensity and magnetic field gradient is varied in a predetermined distribution to create a non-uniform distribution of levitation forces.

U.S. Pat. No. 3,612,630 pertains to a bearing using a fluid pad between two surfaces having relative motion with respect to each other. The pad contains magnets which define a magnetic gap having a predetermined configuration on a predetermined periphery. The gap contains magnetic flux which captures magnetic fluid. The fluid produces a seal.

U.S. Pat. No. 3,620,584 pertains to a means for axially sealing a shaft using knife edge magnets for concentrating magnetic flux around the shaft to hold ferrofluid seals in place.

U.S. Pat. No. 3,780,593 pertains to a fluid bearing suitable for use in a gyroscope. The bearing has conical bearing surfaces with a substantially uniform gap therebetween. The gap is filled with ferro-magnetic fluid to support one of the bearing surfaces and keep the bearing surfaces separated. At the end of the conical bearing surfaces, is a conically divergent reservoir for storing the overflow of fluid, such overflow being caused by temperature variations, and the like.

U.S. Pat. No. 3,726,574 pertains to a Ferrohydrodynamic low friction bearing. An overlapping flange is used to minimize leakage.

U.S. Pat. No. 3,746,407 pertains to another ferrohydrodynamic bearing wherein the opposing bearing faces are substantially parallel with a ferro fluid between the bearing faces.

U.S. Pat. No. 3,891,282 teaches an apparatus having knife edge seals against a shaft. The sealing blades are magnetized to contain a ferro-fluid.

U.S. Pat. No. 3,918,773 pertains to a thrust bearing using ferro-fluids and a knife edge to concentrate the magnetic field to hold the fluid at the knife edge, thereby producing a fluid seal.

BRIEF SUMMARY OF THE INVENTION

The apparatus of this invention is a seal for a fluid bearing. A spinning shaft is floated on a fluid relative to its journal. The seal of this invention prevents the fluid from leaking out of the bearing even when the atmospheric pressure outside of the bearing is low.

The fluid contains small particles of ferro-magnetic material to make the fluid responsive to an externally applied magnetic field. The size of the particles and the surface tension of the fluid are chosen so that retention of the magnetic particles by the magnetic field also retains the fluid.

A radially inwardly directed flange of ferromagnetic material at each end of the bearing confines the ferro-fluid. The spacing between the flange and the axially adjacent ferro-magnetic member flares toward the axis so that the maximum separation occurs adjacent the shaft. The flaring between the flange and its axially adjacent member occurs either by causing the flange to extend conically away from the axially adjacent member, by causing the axially adjacent member to be shaped conically, or by both.

The gradual separation of the flange and its axially adjacent ferro-magnetic member produces a magnetic gradient which forces the magnetic particles in the ferro-fluid radially outward toward the region of minimum separation. The separation between the flange and its axially adjacent ferro-magnetic member must be small enough that the surface tension of the fluid causes the fluid to adhere to the particles and be forced with the particles toward the region of minimum separation.

The volume of the region between the flange and the axially adjacent ferro-magnetic material is preferably adequate to accommodate expansion and contraction of the fluid volume as the temperature changes. As the temperature decreases, the fluid decreases in volume. The decrease in volume should not cause the fluid to contract beyond the region of minimum separation between the flange and the axially adjacent ferro-magnetic member. As the temperature increases, the increase in volume should not exceed that which can be contained by the surface tension of the fluid about the magnetic particles. The latter consideration limits the angle of flare of the flange and the axially adjacent ferro-magnetic material.

It is therefore an object of this invention to seal a bearing containing a ferro-fluid.

It is a more specific object of this invention to seal such a bearing by using a magnetic field.

It is still a more specific object of this invention to confine such fluid within a region adjacent the end of a ferro-fluid bearing.

Other objects will become apparent from the following description, taken in connection with the accompanying drawings.

DETAILED DESCRIPTION OF THE INVENTION

Figure 1:
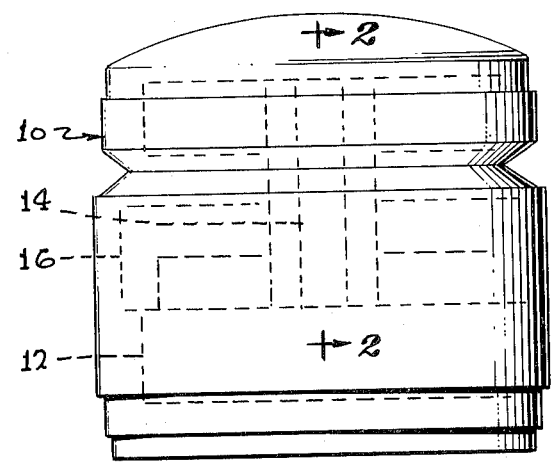
FIG. 1 is a shell of a typical gyroscope using a ferrofluid bearing to support the rotor.

FIG. 1 shows the outer housing 10 of a typical gyroscope using a fluid bearing with a seal of this invention. A rotor 12 of a gyroscope is attached to a shaft 14 which spins on a ferro-fluid bearing relative to a stator 16.

Instead of having the rotor of the gyroscope attached to the shaft, the shaft may be the stator, and the rotor may be attached to the outer journal of the bearing.

The gyroscope and the bearing itself is not part of this invention. The invention pertains to the particular structure which retains the ferro-fluid in the bearing.

The bearing itself is explained to place the structure of the seal of the invention in its proper setting. In any of the bearings the rotor and stator may be interchanged.

Figure 2:
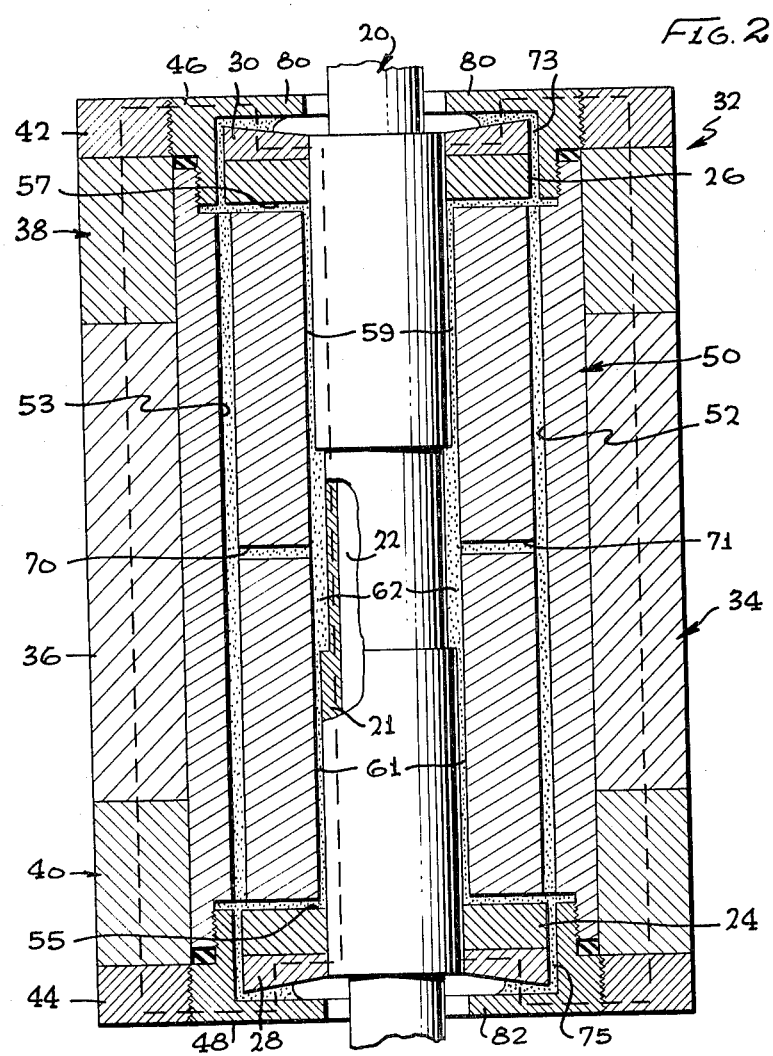
FIG. 2 is a sectional view of one embodiment of the invention, taken at 2—2 in FIG. 1.

In FIG. 2, the shaft 20 has a ferro-magnetic sleeve 21 and a non-ferro-magnetic core 22. A non-ferro-magnetic washer 24,26 is attached to both ends of the sleeve 21. A ferro-magnetic washer 28,30 abuts the washers 24,26 externally thereof. The washers 28,30 are a part of the means of this invention for containing the ferro-fluid within the bearing.

If the shaft 20 and its attachments are assumed to be the stator, the rotor 32 is external thereof. The rotor 32 has an outer sleeve 34 having a ferro-magnetic cylindrical member, usually of soft iron, axially positioned centrally of the rotor. At each end of the ferro-magnetic member 36 are cylindrical permanent magnets 38,40. A pair of ferro-magnetic end washers, usually of soft iron, are positioned at 42,44 axially outward from the magnets 38,40. Ferro-magnetic end-plugs 46,48 screw into or otherwise engage the end washers 42,44. The end-plugs 46,48 are part of the means for containing ferro-fluid of this invention.

A cylindrical member 50 fits inside the member or sleeve 34. Portions 36,38,40,42,44 and member 50 are glued together or otherwise affixed to each other.

The cylindrical member 50 has a plurality of axially extending bores, two of which are shown at 52 and 53. The bores are at substantially the same radius and are preferably uniformly distributed about the axis of the cylindrical member 50. The bores preferably extend the full length of the member 50 between the thrust bearing regions 55,57. Spacing is provided between member 50 and the washer 26 in the bearing regions 55,57. Spacing is also provided in the radial bearing regions 59,61 and in the reservoir region 62.

The reservoir region 62 is formed by decreasing the outer radius of the sleeve 21 in that region. The reservoir region 62 may have some bearing capability.

A ferro-fluid having ferro-magnetic particles therein is positioned in region 55 to provide a thrust bearing between the end of member 50 and the washer 24. It is also in region 57 to provide a thrust bearing between the end of member 50 and the washer 26. The bores 52, 53 and similar bores allow fluid to flow freely between the thrust bearing regions 55 and 57. Each bore such as 52,53 has a radially inwardly extending bore such as bores 70,71 connecting that bore 52,53 to the reservoir 62. Ferro-fluid is also within the radial or journal bearings 59,61 where free flow of such fluid occurs between the reservoir 62 and the thrust bearing regions 59,61. The regions 73,75 are merely spacing regions between the end washers 28,24 on the shaft 20 and cap members 42,44 on the rotor 32.

The screwed-in end members 46,48 have radially inwardly extending flanges 80,82 which do not extend inwardly as far as shaft 20. The flanges 80,82 together with the washer-like members 28,30 form pockets which diverge toward the shaft 20. The flanges 80,82 and members 28,30 form one embodiment of this invention for retaining ferro-fluid within the bearing structure.

In the embodiment shown in FIG. 2, the flange 80 extends with its inner surface perpendicular to the axis of the shaft 20, and the outer surfaces of the washers 28,30 slant axially toward the center of the bearing structure. The pocket or cavity created between the opposing surfaces of member 30 and 80 and between members 28 and 82 is wider as one approaches the shaft 20.

The permanent magnets 38 and 40 produce magnetic flux which flows through ferro-magnetic elements 42,46,80, thence across the gap between elements 80 and 30. The flux then flows through ferro-magnetic element 30, ferro-magnetic sleeve 21, element 28, across the gap between elements 28 and 82, thence through elements, 82 and 44, through permanent magnet 40 and through ferro-magnetic cylinder 36. As the flux crosses the ferro-fluid gaps between elements 30,80 and elements 28,82 the flux density is higher where the separation between the elements is minimum. Because of the higher flux density in the region of minimum separation, the magnetic particles within the ferro-fluid are attached toward that region of mimimum separation. Because of the surface tension of of the ferro-fluid, the liquid portion of the fluid is carried with the ferro-magnetic particles toward the region of minimum separation. In this manner, the ferro-fluid is held within the bearing structure.

The volume of the pocket created between elements 30, 80 and the pocket between elements 28,82 is designed such that changes in the volume of the fluid due to changes in temperature and pressure do not cause the fluid edge to retreat beyond the point of minimum separation between the elements 30,80 and the elements 28,82. Nor is the fluid edge allowed to advance beyond the point wherein surface tension of the liquid portion of the ferro-fluid is able to hold that edge intact.

Thus, the purpose of the divergent pocket is to allow expansion of the fluid as temperature change takes place. The volume of the pocket is dependent on the overall fluid expansion encountered. The pocket or cavity created is contoured to hold the fluid from escaping while keeping the fluid intact through force balance generated by the steady magnetic field and the force of surface tension.

Figure 3:
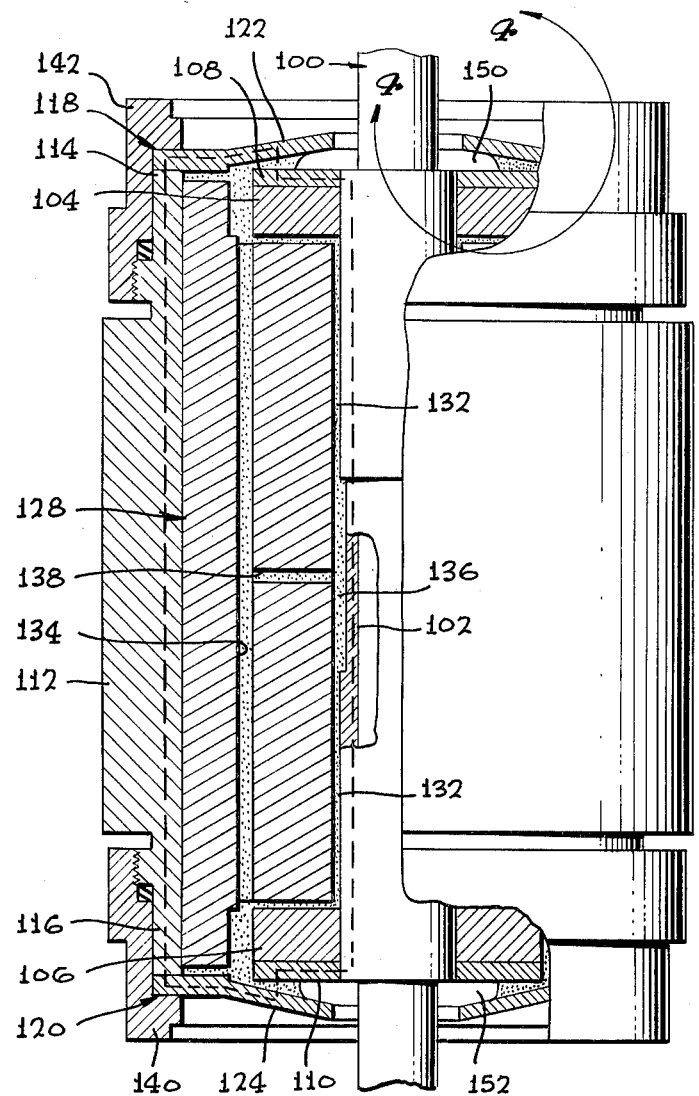
FIG. 3 is a sectional view of a second embodiment of the invention, taken at 2—2 in FIG. 1.

The embodiment of FIG. 3 teaches an alternative ferro-fluid bearing and an alternative configuration of the retaining structure of this invention. The embodiment of the ferro-fluid retaining structure of FIGS. 2 and 3 are not intended to be configured only with the specific bearing structures shown. For example, the retaining structure of FIG. 2 could be used with the bearing structure of FIG. 3, and the retaining structure of FIG. 3 could be used with the bearing structure of FIG. 2. Further, any of the retaining structures herein could be used to hold ferro-fluid within a larger structure or reservoir which is not necessarily a bearing structure. The retaining structure of this invention, however, is particularly useful in connection with a gyroscope which supports its rotor on a ferro-fluid bearing.

Figure 4:
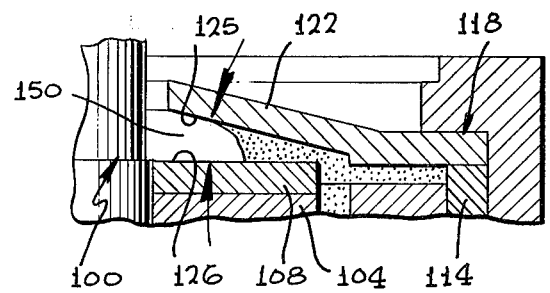
FIG. 4 is an enlarged view, taken at 4—4 in FIG. 3.

In FIGS. 3 and 4, shaft 100 has a sleeve 102 of ferro-magnetic material on the exterior thereof. A non-ferro-magnetic washer 104,106 are attached to opposite ends of the sleeve 102. Two ferro-magnetic washers 108,110 are also attached to the shaft 100 and the sleeve 102 axially adjacent and external to the washers 104,106.

A substantially cylindrical permanent magnet 112, having substantially identical end portions 114,116 of smaller outside diameter forms the outer portion of the bearing structure of FIGS. 3 and 4. A washer-like member 118, 120 of ferro-magnetic material has a flared portion 122,124 forming a substantially conical inner surface 125 opposite the substantially planar surface 126 of washer 108. The inwardly positioned ends of surfaces 125 are spaced farther apart than the outwardly positioned ends to hold ferro-fluid when magnetic flux crosses the gap between surfaces 125,126.

A cylindrical member 128 is attached to the permanent magnet member 112 and is spaced-apart from the shaft 100 to form a radial or journal bearing. The bearing is on ferro-fluid in the region 132. Extending the length of the member 128 are a plurality of tubes or conduits, one of which is shown at 134. Each conduit 134 communicates with the reservoir 136 by a radially directed conduit, one of which is shown at 138. A retaining ring 140 is positioned over the radially outward end of member 120 and around the end 116 of permanent magnet 112. A similar retaining ring 142 is positioned over the radially outward end of member 118 and around the end 114 of permanent magnet 112. The members 128, 112,118,142,120,140 are preferably screwed together, but they may be otherwise attached.

Magnetic flux flows from the end 114 of magnet 112, thence through ferro-magnetic member 118, from the portion 122 across the gap to the member 108, thence through the sleeve 102, thence through the member 110 and across the gap to the portion 124 of member 120 and back to the end 116 of the magnet 112.

The flux density is greatest between members 108,118 and members 110,120 where the gap therebetween is smallest, and the flux density decreases gradually toward the wider gap region. The ferro-magnetic particles in the ferro fluid are attracted toward the portion of the pockets 150,152 where the flux density is greatest. The surface tension of the ferro-fluid causes the fluid to be held with the ferro-magnetic particles. The volume of the pockets 150,152 are such that expansion of the ferro-fluid does not cause the fluid to advance beyond the point where it can be held by surface tension alone, and contraction of the fluid does not cause the fluid to contract beyond the region of maximum flux density.

The angle of flare between the two opposing surfaces 125,126 is made large enough that it concentrates the flux with a flux density at the radially outward position which is strong enough to hold the ferro-magnetic particles within the cavity formed by the two opposing surfaces. The angle of flare between the two opposing surfaces is made small enough so that when the ferro-fluid has expanded to its full volume, the fluid will still be in a region wherein the surface tension on the fluid edge will hold the fluid.

FIG. 2 shows the axially inner surface of the formed pocket flaring toward the axis of the bearing fixture. FIGS. 3 and 4 show the axially outer surface of the formed pocket flaring toward the axis of the bearing fixture. Another embodiment might showing both surfaces flaring or diverging toward the axis of the bearing fixture. Further, the angle of flaring or diverging might be the same or different on the two surfaces.

It is also within the contemplation of this invention that the direction of flare could be radially outward instead of radially inward. Such a structure might not be optimum for use in a gyroscope, but for other purposes might be appropriate.

It is also within the contemplation of this invention that the source of ferro-fluid might not be a fluid bearing, but some other kind of apparatus or reservoir. It is important that the source of fluid not have a head which is so great that it forces fluid out of the pocket formed between the two diverging ferro-magnetic surfaces.

It is likewise within the contemplation of this invention that the diverging surfaces need not be cnical or planar, but that the diverging surfaces could be formed from a non-linear curve.

It is further contemplated that an electro-magnet could be used instead of a permanent magnet.

Thus the configuration of this invention comprises means or structure for forming two diverging surfaces of revolution which do not touch and which are attached on their closest edge to a source of ferro-fluid. A source of magnetic flux is needed to direct magnetic flux across the gap or pocket formed between the two surfaces. To facilitate the guiding of the magnetic flux, the structures forming the two surfaces should be of ferro-magnetic material.

The closest edge between the two surfaces is preferably radially outward from the remainder of the surfaces of revolution, but an alternative embodiment has the surfaces with their radially inward edges closest together (not shown).

Typically the outward edges (i.e., the edges farthest apart open into a relatively low gas pressure region. For example, the outside pressure could be atmospheric, but it is as likely to be under a substantial vacuum. Thus the pressure differential between the surrounding gas pressure and the pressure of the ferro-fluid at the edge of minimum separation of the pocket-forming surfaces.

Thus, the structure of this invention adequately prevents leakage of ferro-fluid from a reservoir over a limited range of pressure differences between the ferro-fluid on one edge of the structure and the ambient gas pressure on the other edge of the structure.

Although the apparatus has been described in detail above, it is not intended that the invention shall be limited by that description, but only by the description and claims together with the accompanying drawings.

We claim:

1. Apparatus for confining a ferro-fluid containing ferro-magnetic particles comprising:

two ferro-magnetic members positioned adjacent each other to form a pocket therebetween for receiving a ferro-fluid, opposing surfaces of said two members having the shape of segments of surface of revolution, the opposing faces of said segments diverging from a close spacing adjacent said pocket toward a wider spacing away from said pocket on radii from the axis of revolution to cause a magnetic gradient between said ferro-magnetic members in a radial direction to force ferro-fluid toward and hold ferro-fluid in said pocket.

2. Apparatus for confining a ferro-fluid containing ferro-magnetic particles comprising:

two ferro-magnetic members positioned adjacent each other to form a pocket therebetween for receiving a ferro-fluid, opposing surfaces of said two members having the shape of segments of surfaces of revolution, said two surfaces diverging from a close spacing on their radially outward edge toward a wider spacing on their radially inward edge.

3. Apparatus as claimed in claim 1 in which at least one of said surfaces is conically shaped.

4. Apparatus for confining a ferro-fluid containing ferro-magnetic particles comprising:

two ferro-magnetic members positioned adjacent each other to form a pocket therebetween for receiving a ferro-fluid, opposing surfaces of said two members having the shape of segments of surfaces of revolution, at least one of said surfaces being planar and perpendicular to the axis of revolution, said opposing surfaces diverging from a close spacing toward a wider spacing along radii from the axis of revolution.

5. Apparatus for confining a ferro-fluid containing ferro-magnetic particles comprising:
   two ferro-magnetic members positioned adjacent each other to form a pocket therebetween for receiving a ferro-fluid, opposing surfaces being conical surfaces of revolution with different apex angles, said opposing surfaces diverging from a close spacing toward a wider spacing along radii from the axis of revolution.

6. Apparatus for confining a ferro-fluid containing ferro-magnetic particles comprising:
   two ferro-magnetic members positioned adjacent each other to form a pocket therebetween for receiving a ferro-fluid, opposing surfaces of said two members having the shape of segments of surfaces of revolution, the shape of said segments diverging from a close spacing adjacent said pocket toward a wider spacing away from said pocket on radii from the axis of revolution, and
   a source of magnetism attached to said ferro-magnetic members to produce magnetic flux having a gradient in a radial direction across the gap between said opposing surfaces to force ferro-fluid toward and hold ferro-fluid in said pocket.

7. Apparatus as claimed in claim 2 in which at least one of said surfaces is conically shaped.

8. Apparatus as claimed in claim 7 and further comprising a source of magnetism attached to said ferro-magnetic members to produce magnetic flux across the gap between said opposing surfaces.

9. Apparatus as claimed in claim 2 in which at least one of said surfaces is planar and perpendicular to the axis of revolution.

10. Apparatus as claimed in claim 9 and further comprising a source of magnetism attached to said ferro-magnetic members to produce magnetic flux across the gap between said opposing surfaces.

11. Apparatus as claimed in claim 2 in which both said surfaces are conical but with different apex angles.

12. Apparatus as claimed in claim 11 and further comprising a source of magnetism attached to said ferro-magnetic members to produce magnetic flux across the gap between said opposing surfaces.

13. Apparatus as claimed in claim 8, 10 or 12, in which said source of magnetism is a permanent magnet together with ferro-magnetic flux conduits connecting opposing poles of said magnet to opposing surfaces of said ferro magnetic members.

14. Apparatus as recited in claim 8, 10 or 12, and further comprising reservoir means containing a ferro-fluid attached to the edges of said surfaces which are closest together.

15. Apparatus as recited in claim 8, 10 or 12, in which the flux density at the edge of narrowest spacing between said opposing surfaces is of sufficient magnitude to hold ferro-magnetic particles which are suspended in the ferro-fluid, the liquid portion of said ferro-fluid has a surface tension adequate to attach such fluid to the ferro-magnetic particles, the minimum spacing between said surfaces is small enough to produce said flux density, the volume between said surfaces in said pocket is adequate to allow for changes in volume of the ferro-fluid, and the spacing between said surfaces at the edge of the ferro-fluid during maximum expansion of such fluid is narrow enough to allow the surface tension of said fluid to hold the fluid in a force balance generated by the steady magnetic field and surface tension.

16. Apparatus as claimed in claim 6 in which said source of magnetism is a permanent magnet together with ferro-magnetic flux conduits connecting opposing poles of said magnet to opposing surfaces of said ferro-magnetic members.

17. Apparatus as recited in claim 6, and further comprising reservoir means containing a ferro-fluid attached to the edges of said surfaces which are closest together.

18. Apparatus as recited in claim 6 in which the flux density at the edge of narrowest spacing between said opposing surfaces is of sufficient magnitude to hold ferro-magnetic particles which are suspended in the ferro-fluid, the liquid portion of said ferro-fluid has a surface tension adequate to attach such fluid to the ferro-magnetic particles, the minimum spacing between said surfaces is small enough to produce said flux density, the volume between said surfaces in said pocket is adequate to allow for changes in volume of the ferro-fluid, and the spacing between said surfaces at the edge of the ferro-fluid during maximum expansion of such fluid is narrow enough to allow the surface tension of said fluid to hold the fluid in a force balance generated by the steady magnetic field and surface tension.

* * * * *